United States Patent [19]
Gustafson et al.

[11] Patent Number: 5,902,386
[45] Date of Patent: May 11, 1999

[54] REDUCED DIAMETER SEPARATOR FOR A VACUUM CLEANER APPARATUS

[75] Inventors: Eric Gustafson; Dean Rohn, both of Cadillac; Craig Cummins, Manton; Skip Erickson, Cadillac; Jeffrey R. Kassien, Tustin; Michael R. Lovelace, Jr., Cadillac, all of Mich.

[73] Assignee: Rexair, Inc., Troy, Mich.

[21] Appl. No.: 08/966,959

[22] Filed: Nov. 10, 1997

[51] Int. Cl.$^6$ ................................................. B01D 47/02
[52] U.S. Cl. ................................ 96/333; 96/359; 15/353; 55/DIG. 3
[58] Field of Search ...................... 55/472, 408, DIG. 3; 96/359, 329, 333, 134, 138, 150; 15/353

[56] References Cited

U.S. PATENT DOCUMENTS

| | | | |
|---|---|---|---|
| 2,102,353 | 12/1937 | Brock | 183/24 |
| 2,221,572 | 11/1940 | Brock et al. | 183/25 |
| 2,228,750 | 1/1941 | Brock | 183/77 |
| 2,608,268 | 8/1952 | Gerber | 183/37 |
| 2,945,553 | 7/1960 | Brock | 183/24 |
| 3,292,347 | 12/1966 | Hodgkinson | 55/257 |
| 4,640,697 | 2/1987 | Erickson | 47/2 |
| 4,693,734 | 9/1987 | Erickson | 47/2 |
| 4,735,555 | 4/1988 | Erickson | 35/4 |
| 4,824,333 | 4/1989 | Erickson | 39/14 |
| 5,090,974 | 2/1992 | Kasper | 47/2 |
| 5,096,475 | 3/1992 | Kasper . | |

Primary Examiner—Jay H. Woo
Assistant Examiner—Robert Hopkins
Attorney, Agent, or Firm—Howard & Howard

[57] ABSTRACT

A vacuum cleaner assembly having a separator of reduced dimensions. The separator is operated at preferably between about 20,000 rpm–30,000 rpm and includes a reduced number of slots formed therein. A labyrinth sealing plate and fan adapter are secured to an upper end of the separator to prevent water and dust and dirt particles from bypassing the separator during operation. The separator is preferably spaced from about 1.0 inch to about 6 inches above the upper surface of the liquid in a liquid reservoir of the vacuum cleaner assembly with which the separator is used. The separator, because of its reduced dimensions and weight, is able to be driven with a small conventional, and less costly and less powerful motor at a higher speed than previously designed separators without suffering breakage. The higher speed of 20,000–30,000 rpm helps to prevent the airflow through the separator from being impeded because of the reduced number of slots. The labyrinth sealing plate coupled to the separator helps to provide a labyrinth seal to prevent water and dust and dirt particles from bypassing the separator and entering the interior of a blower housing. In an alternative embodiment a spider member includes a circumferential raised shoulder portion which cooperates with a circumferential groove formed in a lower surface of the blower housing to form a labyrinth seal.

16 Claims, 7 Drawing Sheets

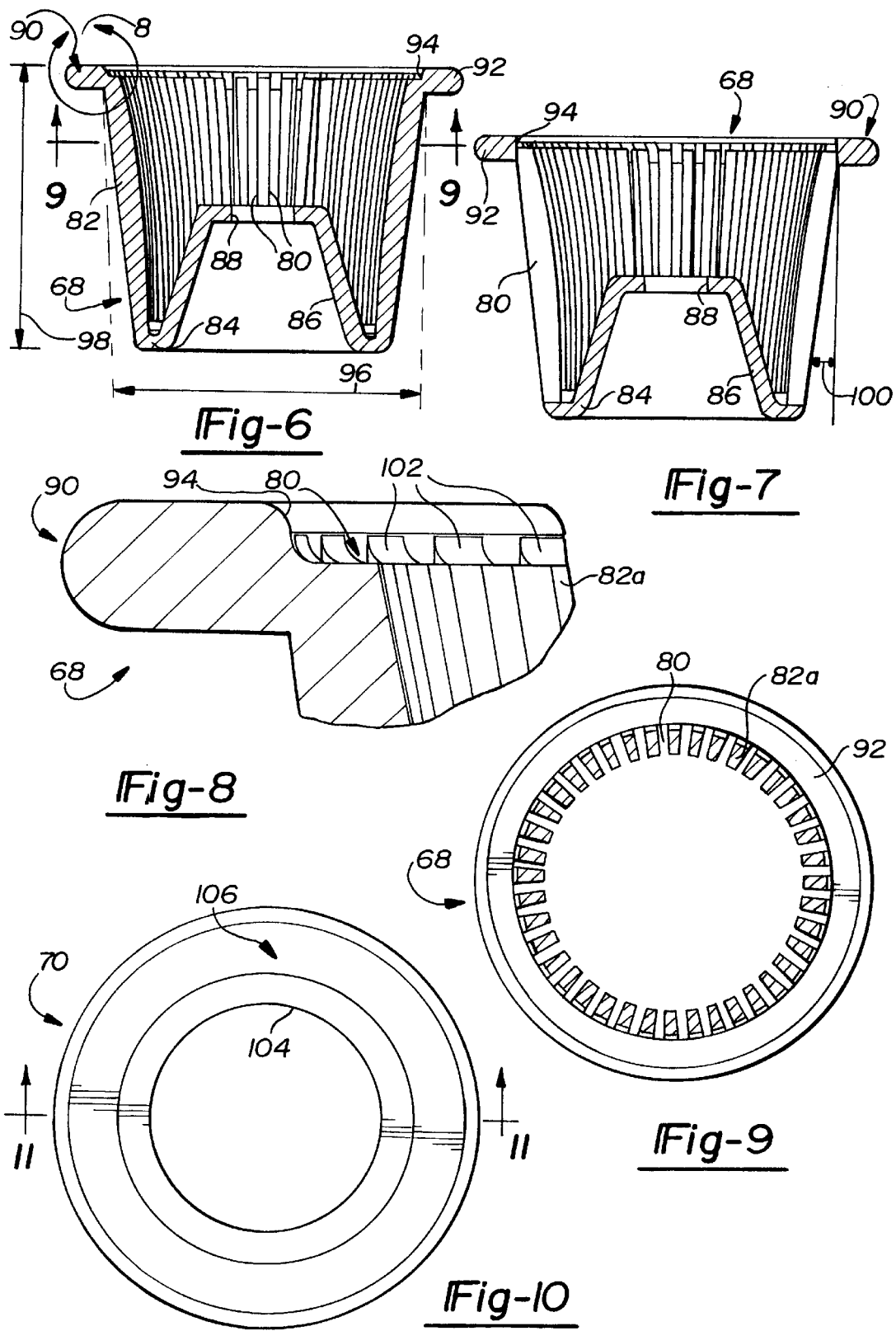

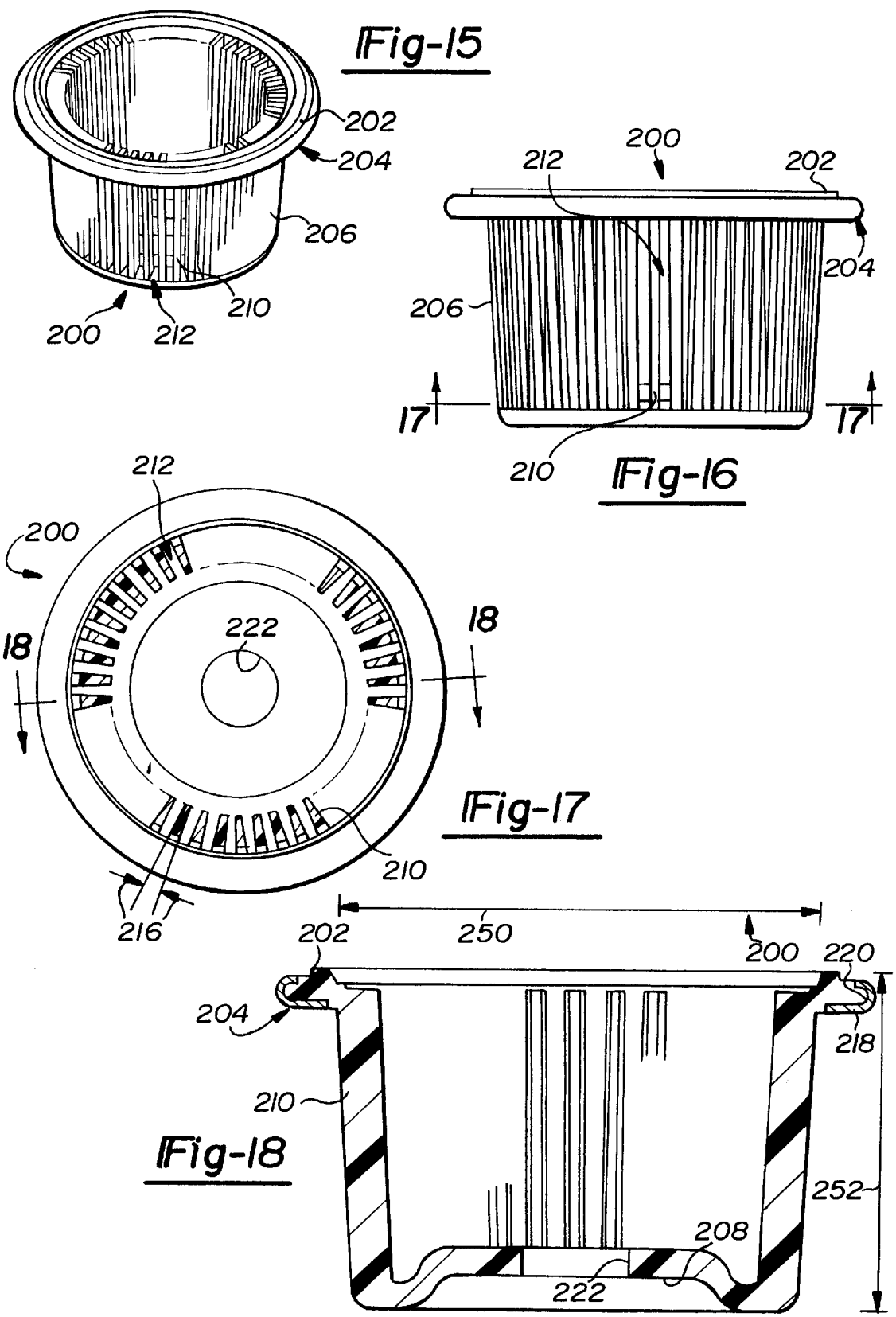

REDUCED DIAMETER SEPARATOR FOR A VACUUM CLEANER APPARATUS

BACKGROUND OF THE INVENTION

1. Technical Field

This invention relates to vacuum cleaner apparatus, and more particularly to a liquid bath vacuum cleaner having an improved separator of reduced dimensions for separating dust and dirt particles from dust and dirt entrained air ingested by the vacuum cleaner apparatus.

2. Discussion

Vacuum cleaners of various designs are used in residential and commercial settings for a wide variety of cleaning purposes. These appliances develop suction force to create air flow which picks up large and small dust and dirt particulates from the surface being cleaned. These particulates are then separated from the ingested air within the vacuum cleaner for later disposal.

One type of vacuum cleaner is a canister type which has a relatively stationary canister which is connected to a moveable wand by a flexible connecting hose. One particular design of canister type vacuum cleaner is known as a liquid bath type. This type of vacuum cleaner directs incoming air and particulates into contact with a liquid bath, which is typically water, which traps particulate matter such as dust and dirt particles entrained in the ingested air stream as the air stream impinges the surface of the liquid. A liquid bath type vacuum cleaner has a significant advantage in that its filtration mechanism is water, thereby eliminating the need for replaceable filters. Accordingly, only the water in a liquid reservoir of the vacuum cleaner needs to be periodically changed.

Numerous designs of liquid bath type vacuum cleaners are presently known. The following U.S. patents, the disclosures of which are hereby incorporated by reference, and all of which are assigned to the assignee of the present invention, relate to various improvements in liquid bath type vacuum cleaner systems: U.S. Pat. Nos. 2,102,353; 2,221,572; 2,886,127; and 2,945,553, and 5,096,475.

An important component of all liquid bath type vacuum cleaner systems is the separator. The separator is a component which is driven rotationally by the motor of the vacuum cleaner system to help separate dust and dirt particles from dust and dirt entrained air ingested by the vacuum cleaner system, which escape being trapped in the liquid bath of the system. Such separators typically are either cylindrical or conical in shape and include a relatively large number of slots formed in a sidewall thereof. The slots allow air to pass through the separator while it is being rotated at a relatively high speed, for example 10,000 rpm or higher, during operation of the vacuum cleaner system. Typically, 70 or more slots each having a width preferably on the order of about 0.040–0.080 inch, and more preferably of about 0.060 inch, are required so as not to overly restrict the flow of air through the separator. Restricting the flow of air reduces the vacuum force and thereby the efficiency of the vacuum cleaner. The drawback with including a relatively large number of slots, however, is that the overall dimensions of the separator must be relatively large. For example, separators in present day use have a diameter at the upper ends of their sidewalls which typically ranges from at least about 3.5 inches up to about 5 inches. This relatively large size necessitates a more powerful motor to drive it at the speeds it needs to rotate at to perform effectively.

It would therefore be highly desirable to provide a separator which is significantly smaller in diameter than presently developed separators, and more particularly a separator having a diameter which is less than preferably about 4 inches when measured at the upper end of the sidewall of the separator. The obvious drawback is that with such a smaller diameter separator, the number of slots must also be reduced. Reducing the number of slots reduces the airflow through the separator if the separator is driven at the same rotational speed as the larger diameter separator mentioned above. Thus, to compensate for the lesser number of slots in the smaller separator, such a separator would have to be driven at an increased speed, typically between about 20,000 rpm–30,000 rpm, to maintain the same quantity of airflow therethrough.

Driving the above-mentioned smaller separator at a higher rotational speed would normally not be a problem because motors capable of such speeds are widely commercially available. However, when driving a smaller separator at such a high speed, it becomes necessary to space the separator a considerable distance from the upper surface of the liquid and the liquid bath positioned below the separator. The increased spacing is needed because the extra high speed at which the separator is driven has been known to cause water to be "pumped" or drawn in from the liquid reservoir through the interface between the upper outer edges of the separator and the housing of the blower of the vacuum cleaner apparatus, which is generating the suction airflow through the separator. The entry of liquid into the interior area of the fan housing is highly undesirable because it can cause corrosion of the blades of the blower fan as well as reduce the airflow through the fan.

Prior attempts to remedy the above problem of drawing water into the interior of the fan housing when using a small separator (i.e., a separator having a diameter of less than about 4 inches) have involved spacing the lower end of the separator a significant distance from the upper surface of the water in the liquid reservoir in an attempt to reduce the amount of water drawn in around the separator. Spacing the separator farther away from the upper surface of the water, however, requires that the overall vacuum cleaner assembly be made considerably taller. The increased overall dimensions of the vacuum cleaner assembly contribute to increased weight of the product, as well as the need for increased or larger packaging materials and increased shipping costs.

It is therefore a principal object of the present invention to provide a vacuum cleaner assembly having a smaller separator with a fewer number of slots than has heretofore been employed in such machines, which does not require spacing the separator a greater distance from an upper surface of a liquid in a liquid reservoir than has previously been necessary.

It is still another object of the present invention to provide a separator having a reduced diameter and reduced overall height, and which is therefore lighter and which can be driven by a smaller motor, and which does not need to be spaced any further from the upper surface of a liquid in a liquid reservoir than present day larger separators to avoid drawing in liquid around the separator.

It is still another object of the present invention to provide a separator assembly which forms a labyrinth seal around a fan housing to prevent liquid from being drawn into the interior area of the fan housing when the separator is positioned closely adjacent an upper surface of liquid in a liquid reservoir of the vacuum cleaner assembly.

It is still another object of the present invention to provide a separator assembly which includes a separator having a reduced number of slots, and which may be operated at a higher rotational speed than previously developed separators, and which may also be spaced relatively close to an upper surface of a liquid in a liquid bath without drawing in liquid around the perimeter of the upper end of the separator during operation.

SUMMARY OF THE INVENTION

The above and other objects are provided by a separator assembly in accordance with preferred embodiments of the present invention. The separator assembly includes a separator and a spider plate which are intercoupled closely adjacent a fan housing and to an output shaft of a motor of an associated vacuum cleaner assembly for rotational movement therewith. The separator has a smaller diameter than previously developed separators and, in the preferred embodiments, typically has a diameter between about 1.0 inches–3.0 inches. As a result of its small diameter, and therefore significantly lighter weight, the separator is able to be rotated at a higher rotational speed, for example, between 20,000 rpm–30,000 rpm, without suffering the breakage which would occur with previously developed larger separators having diameters typically over 4 inches.

In one preferred embodiment, the separator of the present invention has a diameter within a range of preferably about 1.5 inches–3.0 inches when measured at an upper end of the separator. The labyrinth plate is positioned adjacent the upper end of the separator and helps to develop a counter airflow between the labyrinth plate and a housing which houses the blower of the vacuum cleaner assembly. This counter airflow helps to prevent water from being drawn into the interior area of the blower housing around the separator, thus bypassing the separator. This in turn enables the separator to be positioned more closely adjacent an upper surface of liquid within a liquid reservoir disposed below the separator. As such, the overall dimensions of the vacuum cleaner assembly can be kept relatively compact.

In an alternative preferred embodiment of the present invention, the separator operates in connection with a spider member which includes a raised circumferential ring which is adapted to reside within an associated circumferential groove in a portion of a blower housing of a vacuum cleaner apparatus. The raised circumferential ring and groove form an extremely effective labyrinth seal to prevent liquid from entering the area between the spider member and the blower housing. In this embodiment the separator also includes a sidewall having a slightly less degree of taper. A circumferential, raised shoulder portion is also included for engaging with the spider member.

BRIEF DESCRIPTION OF THE DRAWINGS

The various advantages of the present invention will become apparent to one skilled in the art by reading the following specification and subjoined claims and by referencing the following drawings in which:

FIG. 6 is a cross sectional side view of the separator of FIG. 4 in accordance with section line 6—6 in FIG. 4;

FIG. 7 is a cross sectional side view of the separator of FIG. 5 in accordance with section line 7—7 in FIG. 5;

FIG. 8 is an enlarged, fragmentary, cross-sectional view of a portion of the separator in accordance with circle 8 in FIG. 6;

FIG. 9 is a cross sectional plan view of the separator in accordance with section line 9—9 in FIG. 6;

FIG. 10 is a top plan view of the labyrinth plate of the separator assembly of the present invention;

FIG. 15 is a perspective view of a separator in accordance with an alternative preferred embodiment of the present invention;

FIG. 16 is a side view of the separator of FIG. 15;

FIG. 17 is a cross sectional view in accordance with section line 17—17 in FIG. 16;

FIG. 18 is a cross sectional side view of the separator in accordance with section line 18—18 in FIG. 17;

DETAILED DISCUSSION OF THE PREFERRED EMBODIMENTS

Figure 1:
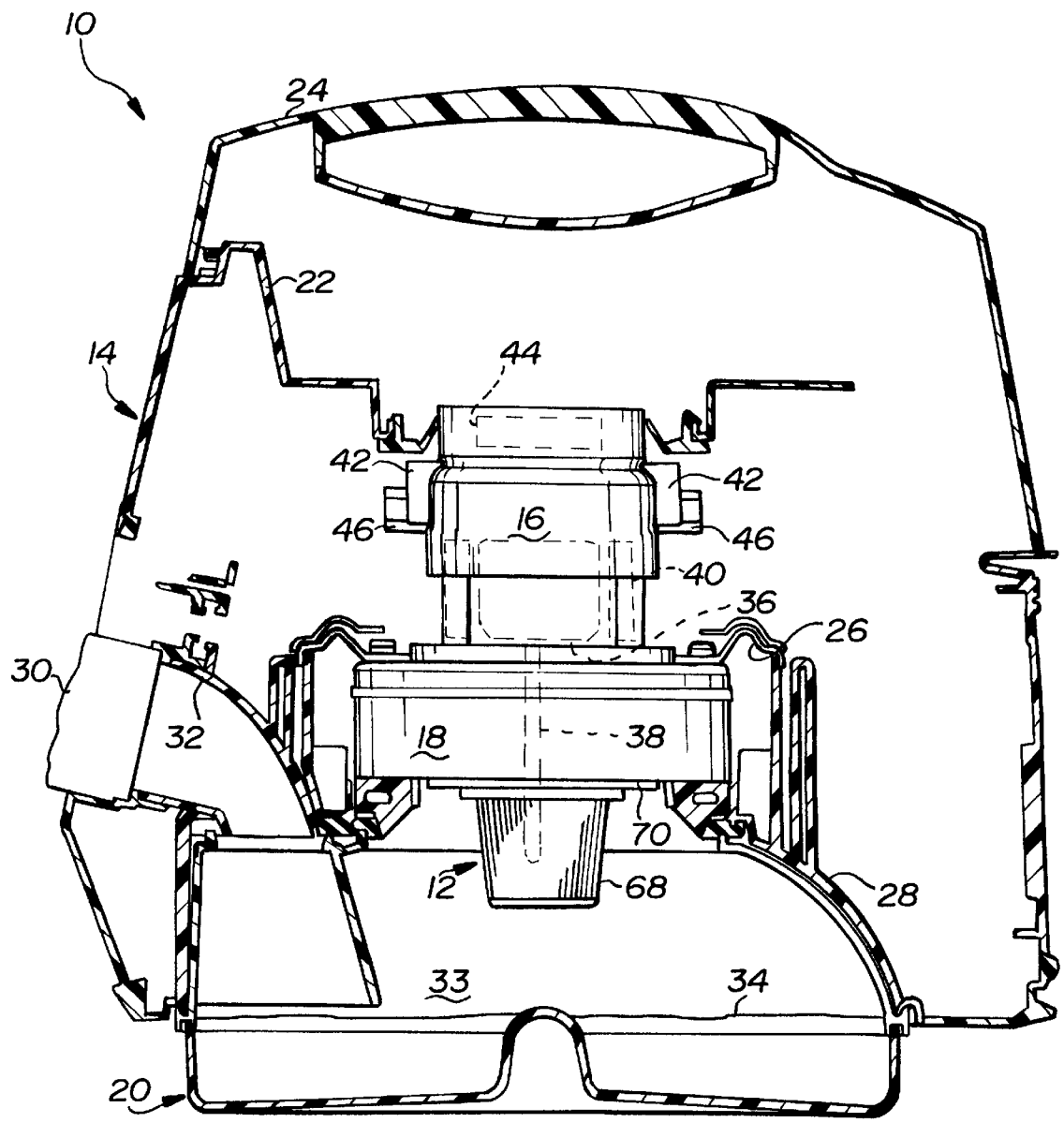
FIG. 1 is a partial cross sectional side view of a vacuum cleaner apparatus in accordance with a preferred embodiment of the present invention and illustrating a quantity of water contained within the liquid reservoir at a lower end of the vacuum cleaner apparatus.

In FIG. 1, there is shown a partial cross sectional view of a typical vacuum cleaner apparatus 10 incorporating a separator assembly 12 of the present invention. The vacuum cleaner system 10 principally comprises a housing assembly 14, a motor assembly 16, a blower assembly 18, the separator assembly 12, a lower water pan 20, a cap 22 and a cap cover 24. Preferably, the housing assembly 14 is easily removable from the water pan 20 to enable convenient removal and replacement of liquid therein. The motor assembly 16 and the blower assembly 18 are generally centrally supported within the housing assembly 14. The motor assembly 16 and the blower assembly 18 are supported within the housing assembly 14 by providing a pair of ring shaped support members 26 and 28.

A vacuum hose 30 is also shown attached to an inlet port 32. The inlet port 32 opens into a lower chamber area 33 in which water or some other liquid bath 34 is contained in the lower water pan 20.

The motor assembly 16 provides motive power for driving a fan assembly (not visible) of the blower assembly 18. The motor assembly 16 includes a central rotating armature 36 encircling and connected to a motor output shaft 38, which extends downwardly into the blower assembly 18. Surrounding the armature assembly 36 is a field assembly 40. A combination bearing retainer and brush holder 42 is provided which retains an upper bearing assembly 44 and supports a pair of brushes 46 which communicate electrical energy to the armature 36 through a conventional commutator (not shown). Motor assembly 16 is of the type generally known as a universal motor which has operating characteristics desirable for use in conjunction with vacuum cleaners. Such a motor is commercially available from the Ametek Company of Kent, Ohio. An axial flow motor fan assembly 50 (FIG. 3) is attached to the upper portion of the motor shaft 38 and generates airflow for cooling the motor assembly 16.

Figure 2:
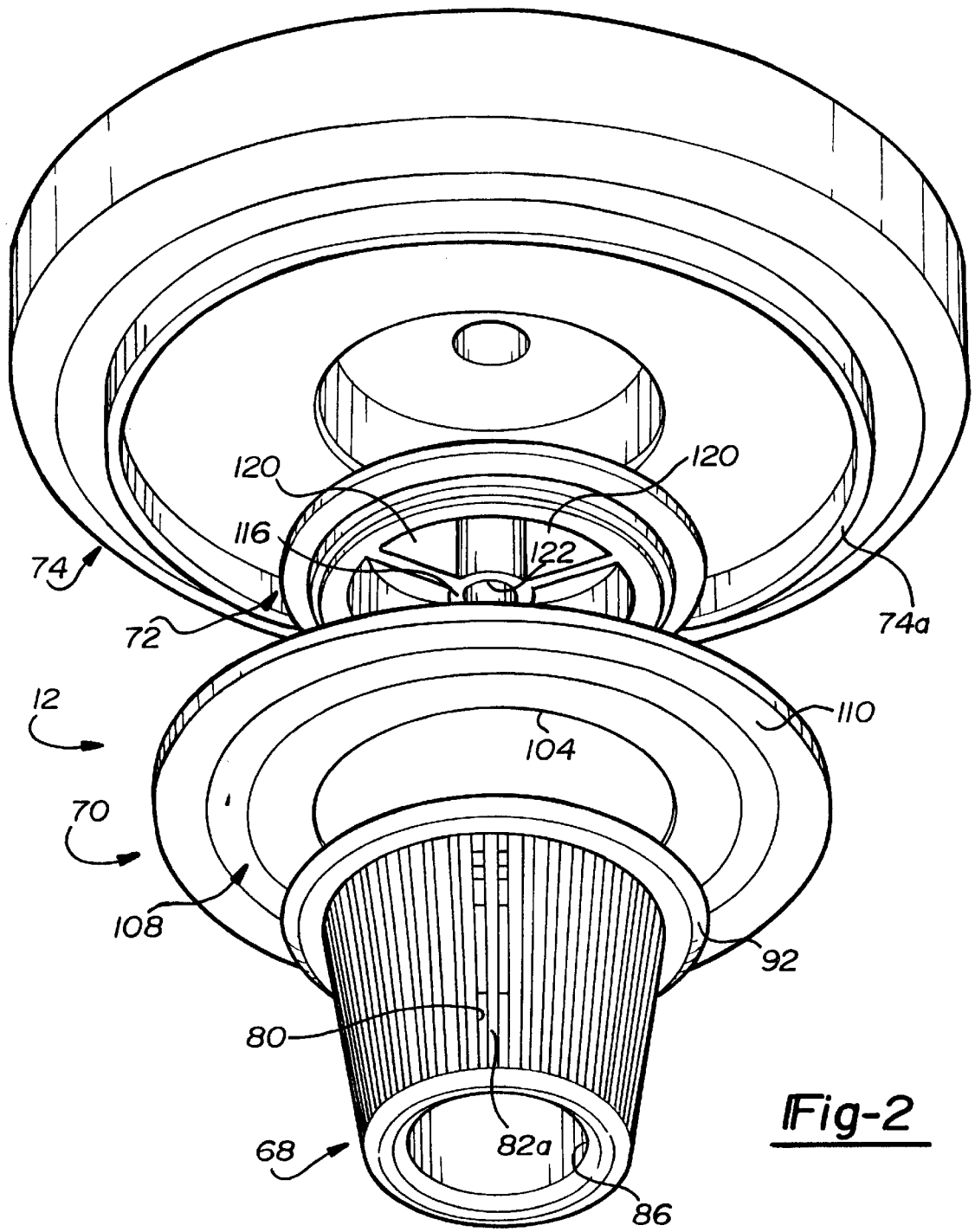
FIG. 2 is an exploded perspective view of a fan housing shroud, a fan adapter, a spider plate and a separator in accordance with a preferred embodiment of the present invention.
Figure 3:
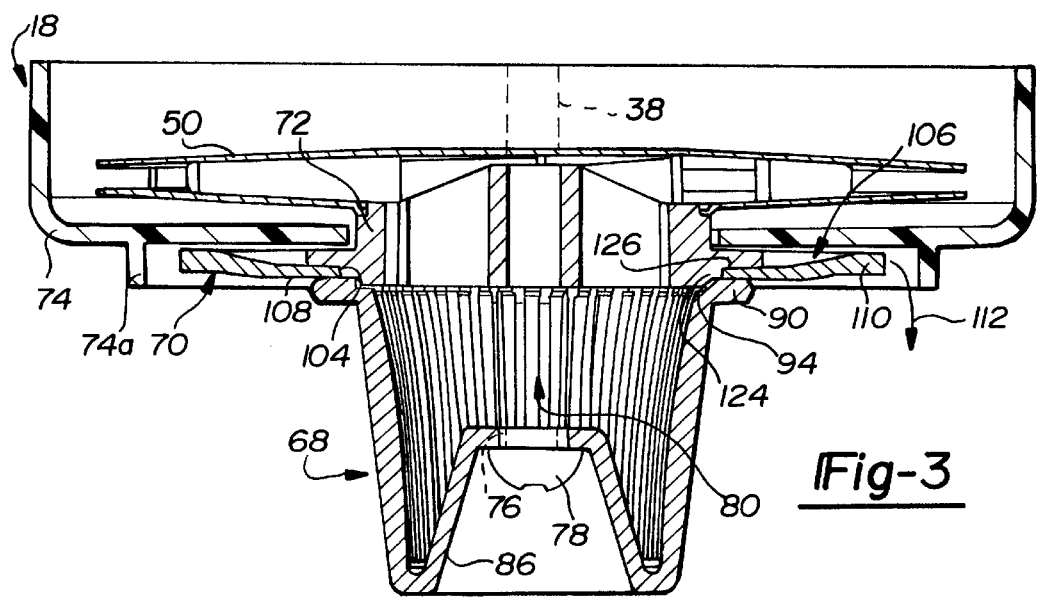
FIG. 3 is a partial cross sectional view of the components illustrated in FIG. 2 in assembled relation.
Figure 4:
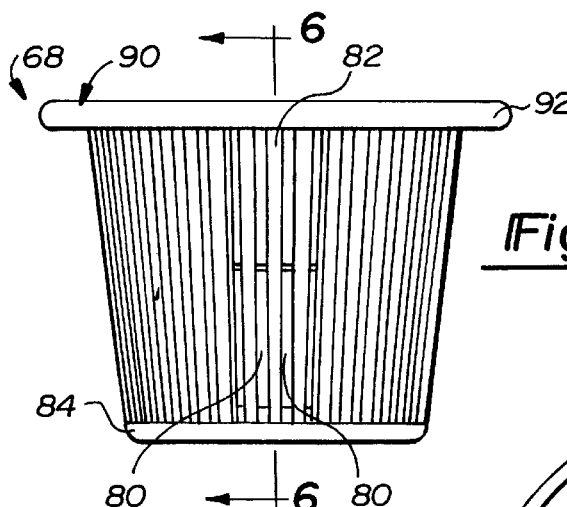
FIG. 4 is a side elevational view of the separator of the present invention.
Figure 5:
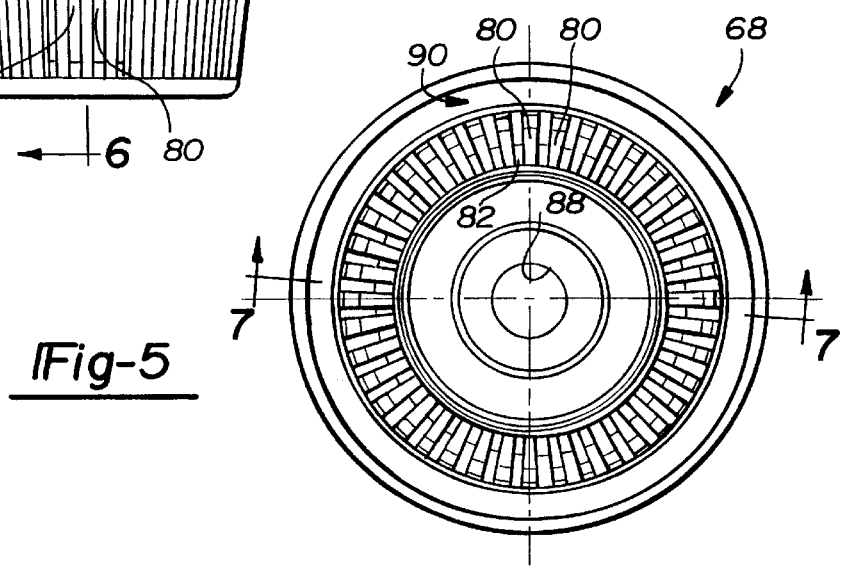
FIG. 5 is a top plan view of the separator of FIG. 4.
Figure 11:
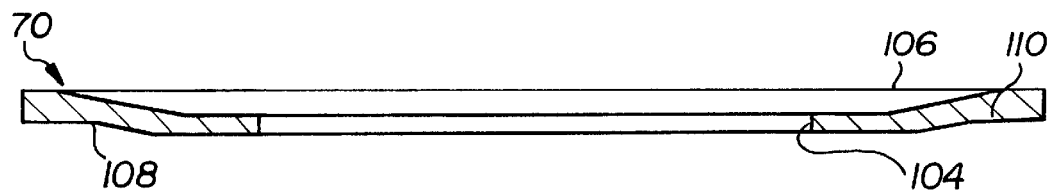
FIG. 11 is a cross sectional side view of the labyrinth plate in accordance with section line 11—11 in FIG. 10.
Figure 12:
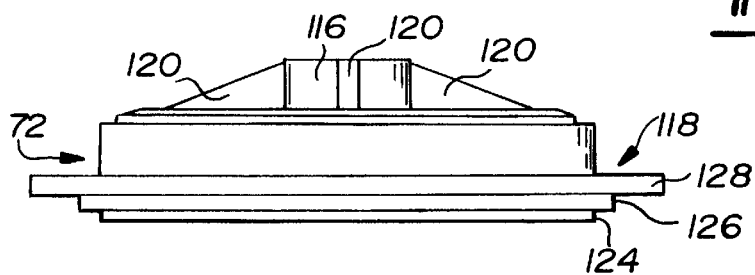
FIG. 12 is a side elevational view of the fan adapter member.
Figure 13:
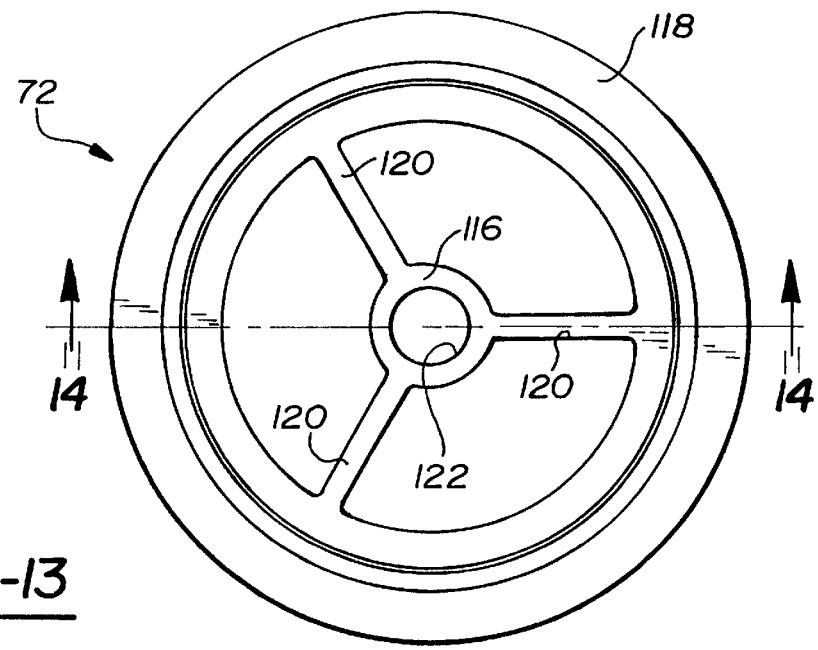
FIG. 13 is a top plan view of the fan adapter of FIG. 12.
Figure 14:
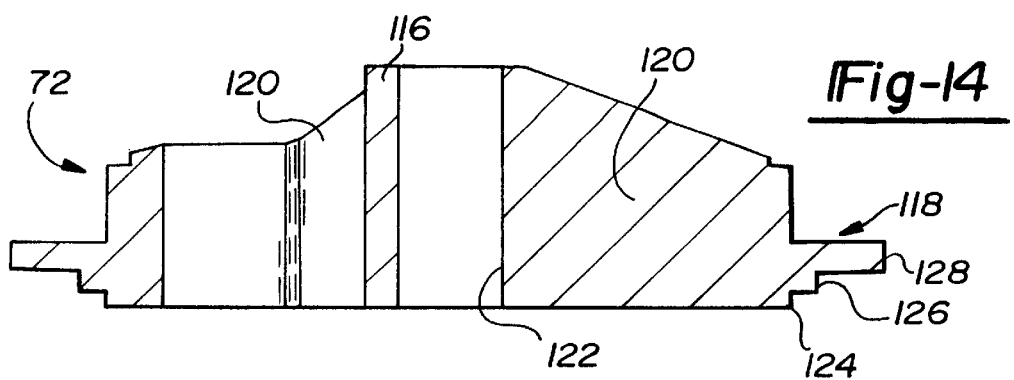
FIG. 14 is a cross sectional side view of the fan adapter of FIG. 13 in accordance with section line 14—14 in FIG. 13.

With reference to FIGS. 2 and 3, the separator assembly 12 includes a separator 68, a disc-like spider plate 70 and a fan adapter member 72. In FIG. 2, a blower housing shroud 74 is illustrated which closes off a lower portion of the blower assembly 18. The separator 68 is removably attached in conventional fashion at a lower, threaded end 76 of the motor shaft 38 by an acorn nut 78. The separator 68 includes a plurality of elongated, generally vertically disposed slots 80 which allow ingested air to be drawn therethrough.

In operation, the motor 16 of the vacuum cleaner apparatus 10 operates to provide a motive force to the motor shaft 38 to rotate the fan assembly 50 of the blower assembly 18 and the separator 68 rapidly about a central axis. The blower assembly 18 creates a strong suction force to draw air entrained with dust and dirt particles in through the vacuum hose 30 and the inlet port 32 (FIG. 1) and into contact with the liquid bath 34. The liquid bath 34, which may employ one or more of a variety of liquid agents but preferably comprises water, operates to trap the majority of dust and dirt particulates ingested into the lower chamber 33. The remaining dust and dirt particles, which will be mostly microscopic in size, are drawn by the blower assembly 18 up toward the separator 68.

The separator 68 operates to separate the microscopic dust and dirt particles from the ingested air by centrifugal force (i.e., centrifugation) generated as a result of its rapid, axial rotation. The particulate-free air flow is then drawn through the slots 80 and eventually exhausted back into the ambient environment. In the preferred embodiments, the separator 68 is rotated at speeds between about 20,000 rpm–30,000 rpm inclusive. It will be appreciated, however, that the separator 68 could be rotated at slower speeds down to about 10,000 rpm but that operation at such slow speeds would be less desirable and the separator 68 less efficient for reasons to be explained in the following paragraphs.

The foregoing has been intended as a general description only of the internal operation of the vacuum cleaner assembly 10 with which the separator assembly 12 of the present invention may be used. More specific details of the operation of liquid bath vacuum cleaner assemblies may be obtained by referring to the previously identified U.S. patents.

With reference to FIGS. 2, 3 and 6–9, the separator 68 of the present invention is shown in greater detail. With specific reference to FIGS. 2 and 6, separator 68 includes a frusto-conically shaped outer side wall 82 in which are formed the plurality of elongated, longitudinal and vertically orientated slots 80. The portion of the sidewall 82 between each pair of slots 80 forms a rib 82a. Each of the slots 80 extends substantially the entire length along the side wall 82. A lower end portion 84 of the separator includes a recessed area 86 having an opening 88 formed therein concentrically with the outer side wall 82. An upper end 90 of the separator 68 includes a flange 92 having a step 94. The overall diameter of the separator 68, as indicated by arrow 96, is preferably within the range of about 1.5 inch to about 3.5 inches, and more preferably only about 1.25 inches–3.0 inches. The overall height of the separator is preferably about 0.75 inch–2.0 inches, and more preferably about 1.25 inch, as indicated by arrow 98. This provides a preferred diameter-to-height ratio of about 1.2-to-1 to about 1.6-to-1. The separator 68 is preferably manufactured from glass reinforced plastic or from Celstran®, available from the Dow Chemical Co.

Referring to FIGS. 7 and 9, each slot 80 has a preferred width of about 0.05 inch–0.075 inch, and more preferably about 0.065 inch. Preferably about 20–60 equally spaced slots 80, and more preferably about 46 equally spaced slots, are formed circumferentially in the outer side wall 82. With specific reference to FIG. 7, the side wall 82 has a thickness between about 0.100–0.200 inch and preferably tapers slightly, as indicated by angle 100, within a range of between about 2° and 10°, and more preferably by an angle of about 3°. It will be appreciated, however, that the side wall 82 could be formed without any taper or, in other words, that the separator 68 could be formed as a simple cylindrical member if desired. The sidewall thickness of about 0.100–0.200 inch provides a preferred slot depth-to-width ratio of about 2–4.

With brief reference to FIG. 8, each of the ribs 82a of the side wall 82 include a semi-circular or rounded upper corner 102 formed within the step portion 94 of the upper end 90. The purpose of the semi-circular portions 102 will be described momentarily.

With further reference to FIG. 1, the lower end portion 84 of the separator 68 need only be spaced above the upper surface of the liquid bath 34 by about 1.5 to 6 inches. This enables the overall height of the vacuum cleaner 10 to be kept relatively small. This in turn helps to reduce the cost of shipping materials associated with the apparatus 10, as well as the overall weight of the apparatus 10. As will be appreciated, reducing the overall weight helps to reduce the overall cost of shipping the apparatus 10.

Referring now to FIGS. 2, 3, 10 and 11, the labyrinth sealing plate 70 is illustrated. The spider plate 70 includes a relatively large, coaxially disposed aperture or opening 104 (FIGS. 2, 10 and 11), an upper surface 106 and a lower surface 108. A slightly offset circumferential shoulder portion 110 is formed having an outer diameter slightly less than an inner diameter of a depending lip portion 74a (FIG. 3) of the lower shroud 74 such that the flange portion 110 is able to reside within the area circumscribed by the depending lip portion 74a. The spider plate 70 is adapted to rotate with the separator 68 and generates a counter airflow as indicated by directional airflow arrow 112 in FIG. 3. This counter airflow helps to prevent water droplets and dust and dirt particles from bypassing the separator 68 and entering inside the lower shroud 74.

While the spider plate 70 has been shown with the slightly offset flange 110, it will be appreciated that this member could also be formed as a simple planar plate or disc if so desired. It is believed, however, that the slight degree of offset of the flange portion 110 helps to contribute to the development of a strong counter airflow to help impede the entry of liquid dust and dirt particles between the area of the depending lip portion 74a and the labyrinth sealing plate 70. It will also be appreciated that the diameter of the opening 104 is preferably slightly larger than the diameter of the side wall 82 at the upper end 90 of the separator 68 such that the spider plate 70 does not impede the flow of air through the separator.

Referring now to FIGS. 3 and 12–14, the fan adapter 72 is shown in greater detail. The fan adapter 72 includes a boss portion 116 supported coaxially within an outer flange portion 118 by a plurality of web portions 120. Boss portion 116 includes an opening 122 sufficiently large to allow the output shaft 38 of the electric motor assembly 16 to pass therethrough. With specific reference to FIGS. 12 and 14, the outer flange portion 118 includes a first step portion 124, a second step portion 126 and an outermost flange 128.

With brief reference to FIG. 3, the first step portion 124 resides within the step portion 94 of the separator 68 when the separator 68 and the fan adapter 72 are coupled together. The second step portion 126 rests within the opening 104 of the spider sealing plate 70 such that a portion of the sealing plate 70 is sandwiched between the upper end 90 of the separator 68 and the outermost flange 128. In this manner, a seal is formed between the fan adapter 72, the labyrinth spider plate 70 and the separator 68 such that water and dust and dirt particulates cannot enter in between these components.

The separator assembly 12 thus forms a smaller than heretofore required means for separating dust and dirt particles entrained in ingested air without reducing the airflow through therethrough. Importantly, the separator 68, being significantly lighter in weight than most previously developed separators, enables a smaller electric motor to be used while maintaining a relative high air flow (i.e., up to at least about 100 cfm) through the apparatus 10. It has been found that an electric motor having a horsepower rating of only between about 0.5 to 2.5 hp is sufficient to drive the separator at between about 20,000 rpm–30,000 rpm. The reduced weight of the separator 68 allows it to be driven at such high speeds without suffering breakage that would likely occur with previously developed, larger separators. In addition, the labyrinth spider plate 70 prevents water from entering around the separator, which has necessitated spacing the separator 68 a considerable distance from the liquid bath in previously developed liquid bath vacuum cleaner systems. The separator assembly 12 thus enables the overall size of the vacuum cleaner system 10 to be kept relatively compact.

Referring now to FIGS. 15–18, a separator 200 in accordance with an alternative preferred embodiment of the present invention is shown. The separator 200 is similar to the separator 68 shown in FIGS. 1-10 with the principal exception of a raised, circumferential shoulder portion 202 formed in an upper end portion 204, a steeper or more vertical sidewall portion 206 (seen particularly well in FIG. 16) and a shallower lower recessed area 208 (FIG. 18). With specific reference to FIGS. 16 and 17, the separator 200 includes a plurality of ribs 210 which are separated by slots 212. Each slot 212 may vary considerably in width but is preferably between about 0.5 inch and 0.75 inch, and most preferably about 0.68 inch in width. The cross sectional width of each rib 210 may also vary but is preferably between about 0.025 inch and 0.10 inch, and more preferably about 0.069 inch at its widest point, as indicated by dimensional arrows 216 in FIG. 17.

With brief reference to FIG. 18, the top end 204 of the separator 200 includes a rolled annular metal reinforcing ring 218 which circumscribes an outermost lip portion 220. The annular, metal reinforcing ring 218 serves to further strengthen the top portion 204 to better withstand the high speeds at which the separator 200 must operate. An opening 222 permits the separator 200 to be secured to an output shaft of a motor, as will be described momentarily.

Figure 19:
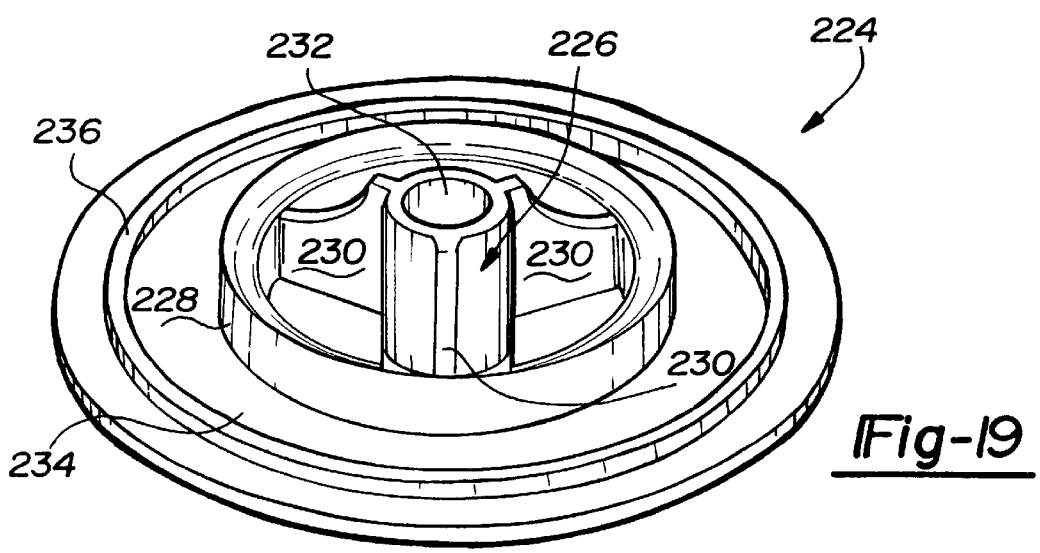
FIG. 19 is a perspective view of a spider member in accordance with an alternative preferred embodiment of the present invention.

Referring now to FIG. 19, a spider member 224 for use with the separator 200 is illustrated. It will be appreciated immediately that with the separator 200 and the spider member 224 are used the disc-like spider member 70 illustrated in FIG. 2 will not be required. This is because of the labyrinth seal that is formed between the spider member 224 and the lowermost portion of the blower housing of the apparatus, which will be described momentarily.

With continued reference to FIG. 19, the spider member 224 includes a central boss portion 226 supported within an annular portion 228 by a plurality of integrally formed members 230. The boss portion 226 includes a bore 232 for allowing an output shaft of a motor to pass therethrough. Integrally formed with the annular portion 228 is a planar portion 234 having an upstanding circumferential shoulder portion 236. The spider member 224 is integrally formed as a single piece component, preferably from a glass filled polystyrene material, and more preferably from Questra®, available from the Dow Chemical Co.

Figure 20:
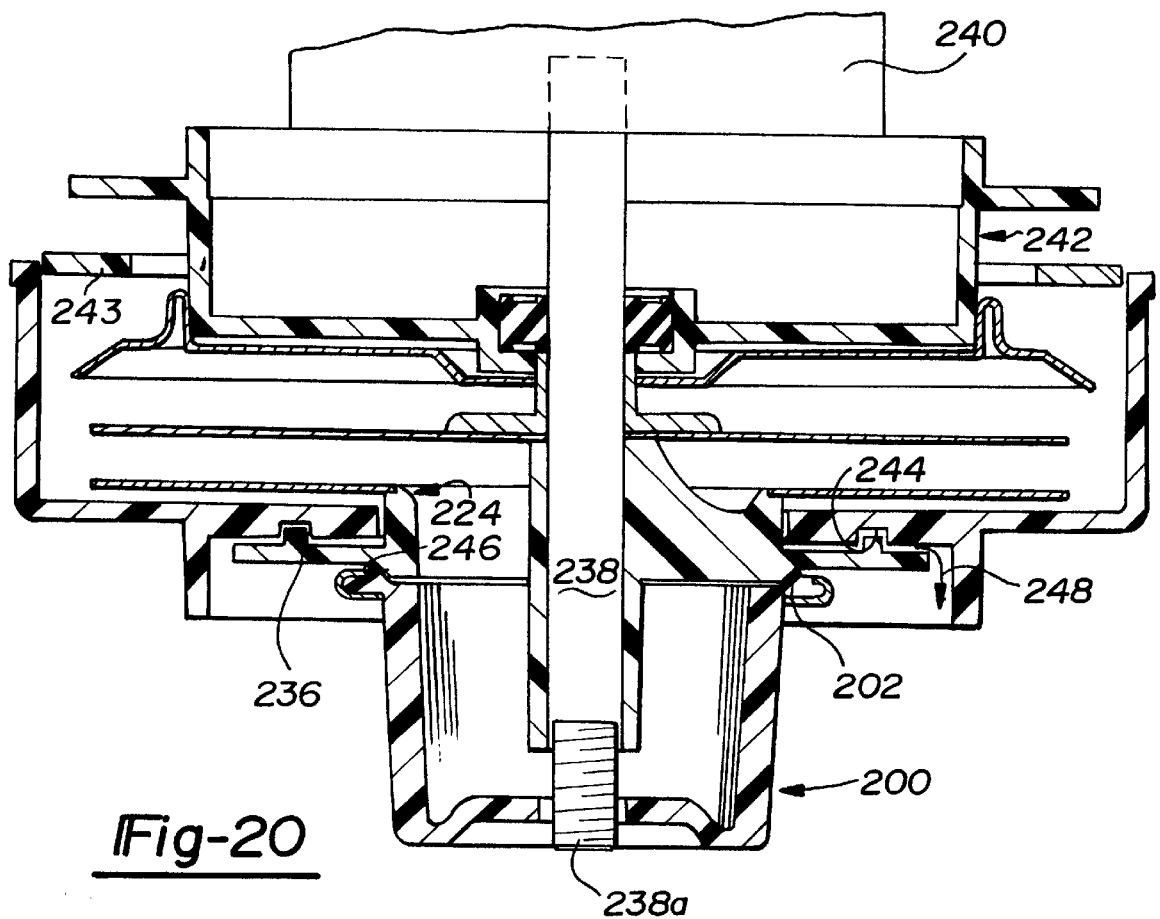
FIG. 20 is a partial cross sectional view of a blower of a vacuum cleaner illustrating the spider member of FIG. 19 and the separator of FIGS. 15 through 18 coupled to the blower housing to form a labyrinth seal.

Turning now to FIG. 20, the separator 200 and the spider member 224 can be seen in assembled relation with an output shaft 238 of a motor 240. The spider member 224 and separator 200 are secured to the output shaft 238 adjacent a blower housing 242. The blower housing 242 encloses a blower fan for developing a suction air flow, as is well understood in the industry. The blower housing 242, however, incorporates a modification in the form of an annular groove or recess 244 formed so as to align with the annular shoulder portion 236 on the spider member 224. The annular groove 244 is of dimensions permitting the annular shoulder portion 236 to project partially within the groove 244 without contacting any portion of the surface of the blower housing 242 when the spider member 224 is coupled to the output shaft 238.

With further reference to FIG. 20, the separator 200 is positioned relative to the output shaft 238 such that an end portion 238a thereof projects through the opening 222. A conventional threaded nut (not shown) is used to secure the separator 200 to the output shaft 238. Once secured, the upstanding annular shoulder portion 202 engages a corner portion 246 of the spider member 224 to prevent air flow therebetween. The spider member 224 provides a counter airflow through the area between the planar portion 234 of the spider member 224 and the blower housing 242, as indicated by directional arrow 248, to provide a labyrinth seal which prevents dirt-entrained liquid from entering between the spider 224 and blower housing 242. An air baffle plate 243 also helps to effect the labyrinth seal and to ensure the counter airflow denoted by reference numeral 248. As will be appreciated, since the spider plate 70 is not required, the assembly of the separator 200 and spider member 224 to the blower 242 is simplified and the overall cost of the vacuum cleaner apparatus reduced.

It will also be appreciated that the separator 200 includes approximately the same overall dimensions as the separator 68 of FIG. 2. One difference, however, is that the taper of the side wall 206 of the separator 200 is slightly less than the taper of the side wall 82 of the separator 68 and preferably on the order of between about 0°–8°, otherwise, the separator 200 is operated at the same speed as the separator 68 (i.e., about 20,000 rpm–30,000 rpm, inclusive). The separator 200 also includes preferably between about 20–60 equally spaced slots 212 (FIG. 17) and has an overall diameter, as indicated by dimensional arrow 250 in FIG. 18, of preferably about 1.5 inch to about 3.5 inches and more preferably between about 1.25 inches–3.0 inches. The overall height of the separator, as indicated by dimensional arrow 252 in FIG. 18, is preferably about 0.75 inch–2.0 inches, and more preferably about 1.25 inches. Accordingly, these dimensions also provide a preferred diameter-to-height ratio of about 1.2-to-1 to about 1.6-to-1.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A vacuum cleaner apparatus comprising:

a main housing;

a motor disposed within said main housing;

a blower housing disposed within said main housing for enclosing a suction fan;

said blower housing having a lower surface with a transversely extending portion;

a spider member responsive to said motor and having a shoulder adapted to cooperate with said transversely extending portion to form a labyrinth seal between said blower housing and said spider member; and a separator operatively coupled to said spider member and responsive to said motor for separating contaminants entrained in air ingested by said apparatus.

2. The apparatus of claim 1 wherein said separator has a body extending between an upper end and a lower end to define a separator height and has a diameter at said upper end between 1.25 inches and 3 inches and wherein a ratio of said diameter to said separator height is in the range of 1.2 to 1 through 1.6 to 1.

3. The apparatus of claim 2 wherein said body of said separator includes a plurality of longitudinally extending slots spaced apart from one another by a predetermined width and said body includes a sidewall portion defining a depth of each one of said slots such that said separator has a slot depth to width ratio of one to two.

4. The apparatus of claim 3 wherein said separator includes between twenty and fifty slots.

5. The apparatus of claim 2 including a liquid reservoir coupled to said main housing to support a quantity of liquid therein, an upper surface of said quantity of liquid being spaced apart from said lower end of said separator by a distance in the range of one to six inches.

6. The apparatus of claim 5 wherein said separator defines an axis of rotation, said motor for driving said separator to rotate about said axis at speeds exceeding 20,000 revolutions per minute.

7. A vacuum cleaner apparatus comprising:

a housing;

a motor disposed within said housing and having an output shaft;

a fan coupled to said output shaft for generating a vacuum airflow through an air intake port in said housing;

a separator operably coupled to said output shaft for separating dust and dirt particulates entrained in air ingested through said intake port, said separator having a body extending between an upper end and a lower end to define a separator height and having a diameter at said upper end between 1.25 inches and 3 inches such that a ratio of said diameter to said separator height is in the range of 1.2 to 1 through 1.6 to 1; and a liquid reservoir coupled to said housing to support a quantity of liquid therein, an upper surface of said quantity of liquid being spaced apart from a lower end of said separator by a distance in the range of one to six inches.

8. The apparatus of claim 7, wherein said body of said separator includes a plurality of longitudinally extending slots spaced apart from one another by a predetermined width and said body includes a sidewall portion defining a depth of each one of said slots such that said separator has a slot depth to width ratio of one to two.

9. The apparatus of claim 7, wherein said separator defines a longitudinal axis of rotation and said motor drives said separator to rotate about said axis at speeds exceeding 20,000 revolutions per minute.

10. The apparatus of claim 7 including a housing shroud for partially enclosing a lower portion of said fan to protect said fan from exposure to said liquid, said shroud having a lip with a first predetermined diameter.

11. The apparatus of claim 10 wherein said separator includes a spider member fixed for rotation with said separator to prevent entry of liquid particles from said liquid reservoir into said fan, said spider having a shoulder with a second predetermined diameter that is less than said first predetermined diameter such that a labyrinth seal is formed between said lip and said shoulder when said separator is installed within said housing shroud.

12. The apparatus of claim 11 wherein said spider and said separator rotate together to produce a counter airflow for preventing water, dust and dirt particulates from bypassing said separator and entering said shroud.

13. The apparatus of claim 11 wherein said housing shroud is comprised of a disc-shaped body having an outer periphery with said lip extending transversely to said body adjacent to said outer periphery.

14. The apparatus of claim 13 wherein said spider member includes a central disc-shaped body with said shoulder being located at an outer periphery, said shoulder and said body being non-coplanar.

15. The apparatus of claim 14 including a fan adapter plate interposed between said spider member and said shroud and operatively coupled to said output shaft of said motor for rotational movement with said output shaft.

16. The apparatus of claim 7 wherein said separator is molded as a single component from fiberglass reinforced plastic.

* * * * *